US010632625B2

(12) United States Patent
Curhan et al.

(10) Patent No.: US 10,632,625 B2
(45) Date of Patent: Apr. 28, 2020

(54) END OF ARM TOOLS FOR SOFT ROBOTIC SYSTEMS

(71) Applicant: Soft Robotics, Inc., Cambridge, MA (US)

(72) Inventors: Jeffrey Curhan, Warwick, RI (US); Craig Demello, Newfields, NH (US); Thomas Womersley, Newton, MA (US)

(73) Assignee: Soft Robotics, Inc., Bedford, MA (US)

( * ) Notice: Subject to any disclaimer, the term of this patent is extended or adjusted under 35 U.S.C. 154(b) by 0 days.

(21) Appl. No.: 16/160,558

(22) Filed: Oct. 15, 2018

(65) Prior Publication Data

US 2019/0111571 A1    Apr. 18, 2019

Related U.S. Application Data

(60) Provisional application No. 62/571,916, filed on Oct. 13, 2017.

(51) Int. Cl.
*B25J 15/00* (2006.01)
*B25J 15/12* (2006.01)
(Continued)

(52) U.S. Cl.
CPC ........... *B25J 15/0023* (2013.01); *B25J 9/142* (2013.01); *B25J 9/1633* (2013.01);
(Continued)

(58) Field of Classification Search
CPC ............... B25J 11/0045; B25J 15/0023; B25J 15/0033; B25J 15/0042; B25J 15/10;
(Continued)

(56) References Cited

U.S. PATENT DOCUMENTS 3,343,864 A * 9/1967 Baer .................... B25J 15/0009
294/119.3
3,601,442 A    8/1971 Orndorff, Jr.
(Continued)

FOREIGN PATENT DOCUMENTS

EP         1750910 A1    2/2007
JP      2013-166215    *  8/2013

OTHER PUBLICATIONS

International Search Report and Written Opinion for application No. PCT/US2018/055883, dated Jan. 30, 2019, 12 pages.

*Primary Examiner* — Dean J Kramer

(57) ABSTRACT

Robotic grippers have been employed to grasp and manipulate target objects. One task posing relatively unique problems is the handling of meat products, which can be difficult to grasp with a conventional gripper due to the surface texture and malleability of the meat, among other factors. This is particularly problematic when the meat product includes a bone, which has different properties from the relatively malleable meat surrounding it. Exemplary embodiments described herein provide robotic grippers having one or more fingers and a layered plate. The layered structure defines grooves sized and configured to lead in and capture the bone structure of the meat product. The grooves provide a backstop for the meat as well as preventing rotation or translation of the bone structure, thus allowing a firm grasp to be secured on the meat product.

19 Claims, 8 Drawing Sheets

(51) Int. Cl.
  *B25J 9/16* (2006.01)
  *B25J 11/00* (2006.01)
  *B25J 9/14* (2006.01)
  *B25J 15/02* (2006.01)
  *B25J 15/06* (2006.01)
  *B25J 15/10* (2006.01)

(52) U.S. Cl.
  CPC ....... *B25J 11/0045* (2013.01); *B25J 15/0033* (2013.01); *B25J 15/02* (2013.01); *B25J 15/0616* (2013.01); *B25J 15/10* (2013.01); *B25J 15/12* (2013.01); *B25J 15/0028* (2013.01)

(58) Field of Classification Search
  CPC ...... B25J 15/12; B25B 5/163; Y10S 294/902; Y10S 901/39
  USPC ..... 294/86.4, 103.1, 902; 269/271, 280, 282
  See application file for complete search history.

(56) References Cited

U.S. PATENT DOCUMENTS

| | | | |
|---|---|---|---|
| 3,640,564 A | 2/1972 | Kuster | |
| 4,273,505 A | 6/1981 | Clark et al. | |
| 4,403,801 A | 9/1983 | Huff et al. | |
| 4,448,405 A * | 5/1984 | Cipolla | B25B 1/2405 269/280 |
| 4,547,121 A | 10/1985 | Nesmith | |
| 4,706,949 A * | 11/1987 | Dossey | B25B 1/24 269/283 |
| 4,715,637 A | 12/1987 | Hosoda et al. | |
| 4,770,456 A | 9/1988 | Phillips et al. | |
| 5,062,761 A | 11/1991 | Glachet | |
| 5,090,758 A | 2/1992 | Lord | |
| 5,125,789 A | 6/1992 | Farr | |
| 5,163,665 A * | 11/1992 | Klearman | B25B 1/241 269/280 |
| 5,245,885 A | 9/1993 | Robertson | |
| 5,250,074 A | 10/1993 | Wilk et al. | |
| 5,385,080 A | 1/1995 | Suzumori | |
| 5,403,056 A | 4/1995 | Wallace | |
| 6,846,029 B1 | 1/2005 | Ragner et al. | |
| 7,475,927 B2 | 1/2009 | Maffeis | |
| 8,210,586 B2 * | 7/2012 | Hawes | B25J 15/0028 294/86.4 |
| 8,403,387 B2 * | 3/2013 | Nakasugi | B25J 15/0009 269/900 |
| 8,727,410 B2 | 5/2014 | Jones et al. | |
| 8,979,151 B2 | 3/2015 | Mukou | |
| 9,046,177 B2 | 6/2015 | Tell | |
| 2004/0217612 A1 * | 11/2004 | Slettedal | E21B 19/14 294/202 |
| 2006/0033350 A1 | 2/2006 | Besch | |
| 2007/0276539 A1 | 11/2007 | Habibi et al. | |
| 2013/0232918 A1 | 9/2013 | Lomerson, Jr. | |
| 2015/0375404 A1 | 12/2015 | Matsuoka | |
| 2016/0089793 A1 | 3/2016 | Truebenbach | |
| 2016/0107316 A1 | 4/2016 | Alt et al. | |
| 2016/0279805 A1 | 9/2016 | Murota et al. | |
| 2017/0203443 A1 | 7/2017 | Lessing et al. | |

* cited by examiner

END OF ARM TOOLS FOR SOFT ROBOTIC SYSTEMS

RELATED APPLICATIONS

This application claims priority to U.S. Provisional Patent Application Ser. No. 62/571,916, filed on Oct. 13, 2017. The contents of the aforementioned application are incorporated herein by reference.

This application is also related to U.S. patent application Ser. No. 16/053,213, filed Aug. 2, 2018, and to U.S. patent application Ser. No. 15/967,210, filed on Apr. 30, 2018.

FIELD OF THE DISCLOSURE

The disclosure relates generally to the field of robotics and particularly to novel structures for gripping meat products, particularly meat products including a bone.

BACKGROUND

Robotic grippers have been employed to automate many tasks by grasping and manipulating items. One task posing relatively unique problems is the handling of meat products, such as ground meat patties, cutlets, etc. These meat products can be difficult to grasp with a conventional gripper due to the surface texture and malleability of the meat, among other factors.

In addition, many meat products (particularly ground meat patties) are relatively planar or disc-shaped. As a result, it can be relatively difficult to secure a strong grasp along the edges of the product alone, and even if a strong grasp is obtained, there is a risk of folding or crumpling the product.

SUMMARY

Embodiments of the present invention are addressed to the problems with handling target objects, and especially meat products, described above. It should be noted that although the present invention is described with reference to the handling of meat products, embodiments of the present invention are equally applicable to the handling of other grasping targets that are generally malleable but include at least one non-malleable portion, or otherwise have properties similar to bone-in meat products.

In general, embodiments of the present invention comprise actuators (also referred to herein as "fingers") and a bumper plate. The bumper plate may include three (or more) layers, with two (or more) groove structures defined by the layers. The groove structures may be sized and shaped to accommodate different types of bone-in meat products, such as meat products having a bone extending in substantially a straight line longitudinally through the meat product, and meat products having a bone extending at an angle with respect to a longitudinal axis of the meat product.

The respective grooves may be configured to guide the meat products to an intended location or configuration, and may accommodate the bone of the meat products so that a meat portion of the products may be grasped more securely. Moreover, the grooves may prevent the bone from rotating or translating during the grasping process, thus improving the grasp quality.

The bumper plate may be made up of a series of distinct layers. For example, a central groove may be defined by the shapes of a first layer and a second layer, while an angled or off-center groove may be defined by the shapes of the second layer and a third layer.

DETAILED DESCRIPTION OF THE PREFERRED EMBODIMENTS

Figure 1A:
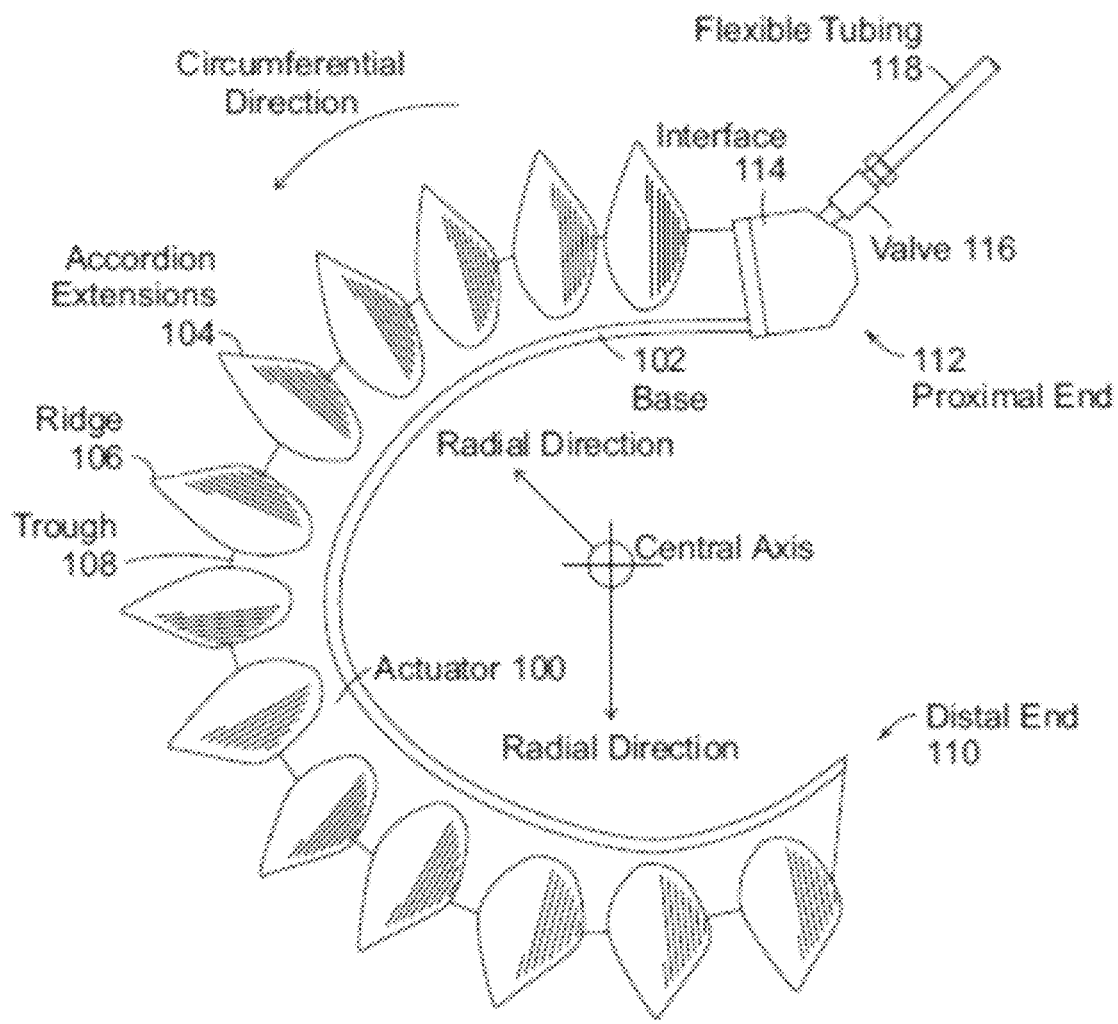
FIGS. 1A-1D depict various examples of soft robotic actuators.

The present invention will now be described more with reference to the accompanying drawings, in which preferred embodiments of the invention are shown. The invention, however, may be embodied in many different forms and should not be construed as being limited to the embodiments set forth herein. Rather, these embodiments are provided so that this disclosure will be thorough and complete, and will fully convey the scope of the invention to those skilled in the art. In the drawings, like numbers refer to like elements throughout.

Background on Soft Robotic Grippers

Conventional robotic actuators may be expensive and incapable of operating in certain environments where the uncertainty and variety in the weight, size and shape of the object being handled has prevented automated solutions from working in the past. The present application describes applications of novel soft robotic actuators that are adaptive, inexpensive, lightweight, customizable, and simple to use.

Soft robotic actuators may be formed of elastomeric materials, such as rubber, coated fabric, or thin walls of plastic arranged in an accordion structure that is configured to unfold, stretch, twist, bend, extend and/or contract under pressure, or other suitable relatively soft materials. As an alternative or in addition to accordion structures, other types or configurations of soft actuators employing elastomeric materials may be utilized. They may be created, for example, by molding or bonding one or more pieces of the elastomeric material into a desired shape. Alternatively or in addition, different pieces of elastomeric material may be thermally bonded, or sewn. Soft robotic actuators may include a hollow interior that can be filled with a fluid, such as air, water, or saline to pressurize, inflate, and/or actuate the actuator. Upon actuation, the shape or profile of the actuator changes. In the case of an accordion-style actuator (described in more detail below), actuation may cause the actuator to curve or straighten into a predetermined target shape. One or more intermediate target shapes between a fully unactuated shape and a fully actuated shape may be achieved by partially inflating the actuator. Alternatively or in addition, the actuator may be actuated using a vacuum to remove inflation fluid from the actuator and thereby change the degree to which the actuator bends, twists, and/or extends.

Actuation may also allow the actuator to exert a force on an object, such as an object being grasped or pushed. However, unlike traditional hard robotic actuators, soft actuators maintain adaptive properties when actuated such that the soft actuator can partially or fully conform to the shape of the object being grasped. They can also deflect upon collision with an object, which may be particularly relevant when picking an object off of a pile or out of a bin, since the actuator is likely to collide with neighboring objects in the pile that are not the grasp target, or the sides of the bin. Furthermore, the amount of force applied can be spread out over a larger surface area in a controlled manner because the material can easily deform. In this way, soft robotic actuators can grip objects without damaging them.

Still further, soft actuators are adaptive, and accordingly a single fixture can grip multiple kinds of objects. Because the outer surfaces of soft actuators are relatively delicate, they can serve in roles such as redirectors for easily bruised or damaged items (e.g., tomatoes) whereas hard fixtures might be limited to manipulating more robust items (e.g., brass valves).

Furthermore, soft actuators will typically not mark the surface being gripped. Typically, when an easily-marked surface (e.g., a veneer) will be gripped by a hard fixture, a protective coating or film may be applied to prevent the part from being marked; this increases the cost of manufacturing. With a soft actuator, this step may be omitted and the part may be protected without a special coating or film.

Moreover, soft robotic actuators allow for types of motions or combinations of motions (including bending, twisting, extending, and contracting) that can be difficult to achieve with traditional hard robotic actuators.

Conventional robotic grippers or actuators may be expensive and incapable of operating in certain environments where the uncertainty and variety in the weight, size and shape of the object being handled has prevented automated solutions from working in the past. The present application describes applications of novel soft robotic actuators that are adaptive, inexpensive, lightweight, customizable, and simple to use.

Soft robotic actuators may be formed of elastomeric materials, such as rubber, or thin walls of plastic arranged in an accordion structure that is configured to unfold, stretch, and/or bend under pressure, or other suitable relatively soft materials. They may be created, for example, by molding one or more pieces of the elastomeric material into a desired shape. Soft robotic actuators may include a hollow interior that can be filled with a fluid, such as air, water, or saline to pressurize, inflate, and/or actuate the actuator. Upon actuation, the shape or profile of the actuator changes. In the case of an accordion-style actuator (described in more detail below), actuation may cause the actuator to curve or straighten into a predetermined target shape. One or more intermediate target shapes between a fully unactuated shape and a fully actuated shape may be achieved by partially inflating the actuator. Alternatively or in addition, the actuator may be actuated using a vacuum to remove inflation fluid from the actuator and thereby change the degree to which the actuator bends, twists, and/or extends.

Actuation may also allow the actuator to exert a force on an object, such as an object being grasped or pushed. However, unlike traditional hard robotic actuators, soft actuators maintain adaptive properties when actuated such that the soft actuator can partially or fully conform to the shape of the object being grasped. They can also deflect upon collision with an object, which may be particularly relevant when picking an object off of a pile or out of a bin, since the actuator is likely to collide with neighboring objects in the pile that are not the grasp target, or the sides of the bin. Furthermore, the amount of force applied can be spread out over a larger surface area in a controlled manner because the material can easily deform. In this way, soft robotic actuators can grip objects without damaging them.

Still further, soft actuators are adaptive, and accordingly a single fixture can grip multiple kinds of objects. Because the outer surfaces of soft actuators are relatively delicate, they can serve in roles such as redirectors for easily bruised or damaged items (e.g., tomatoes) whereas hard fixtures might be limited to manipulating more robust items (e.g., brass valves).

Furthermore, soft actuators will typically not mark the surface being gripped. Typically, when an easily-marked surface (e.g., a veneer) will be gripped by a hard fixture, a protective coating or film may be applied to prevent the part from being marked; this increases the cost of manufacturing. With a soft actuator, this step may be omitted and the part may be protected without a special coating or film.

Moreover, soft robotic actuators allow for types of motions or combinations of motions (including bending, twisting, extending, and contracting) that can be difficult to achieve with traditional hard robotic actuators.

Figure 1B:
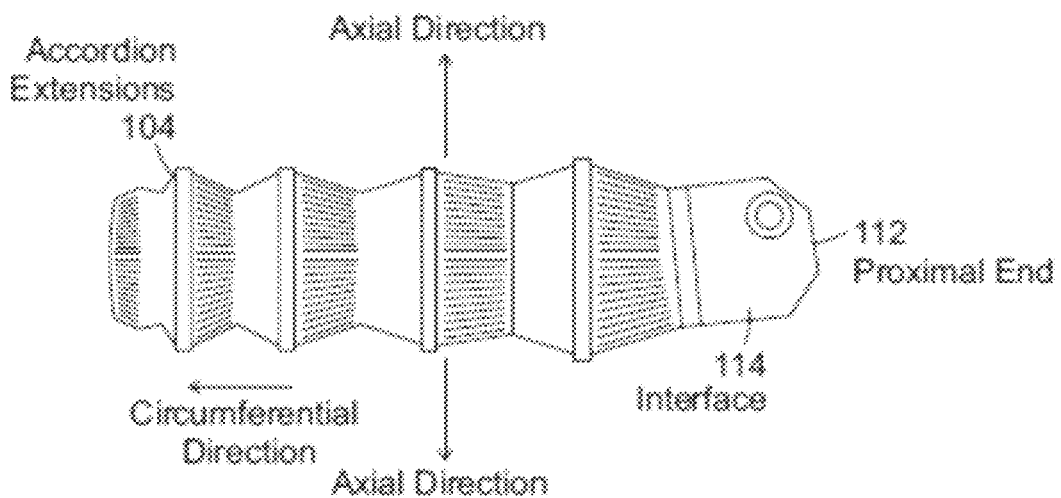
Figure 1C:
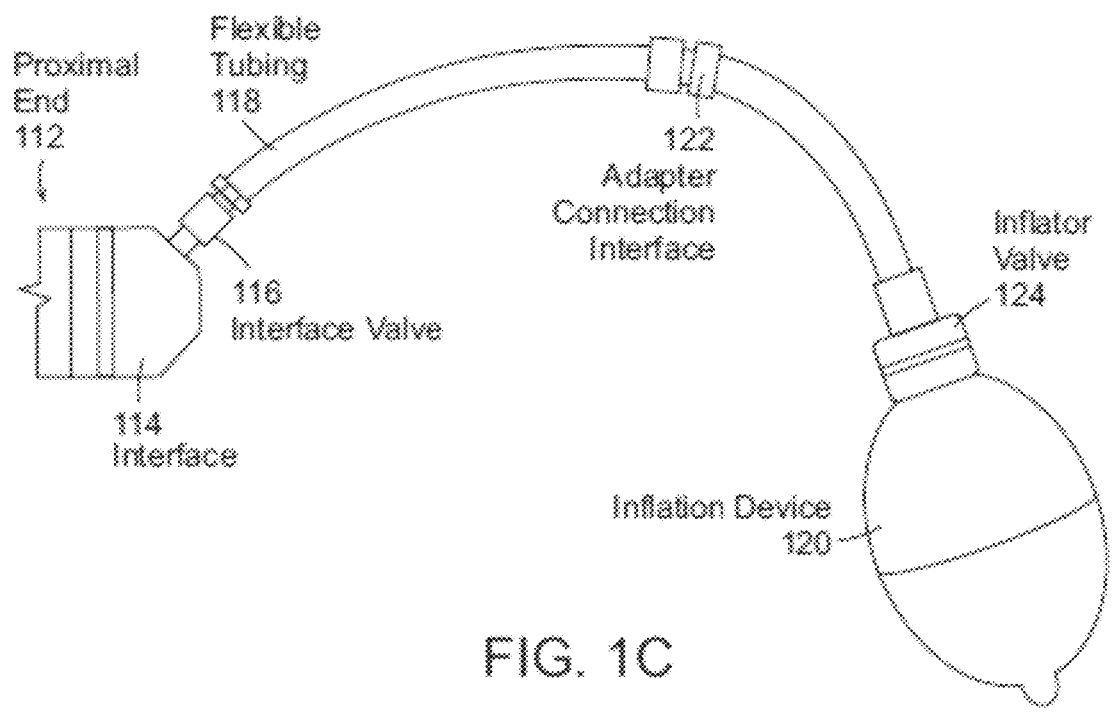
Figure 1D:
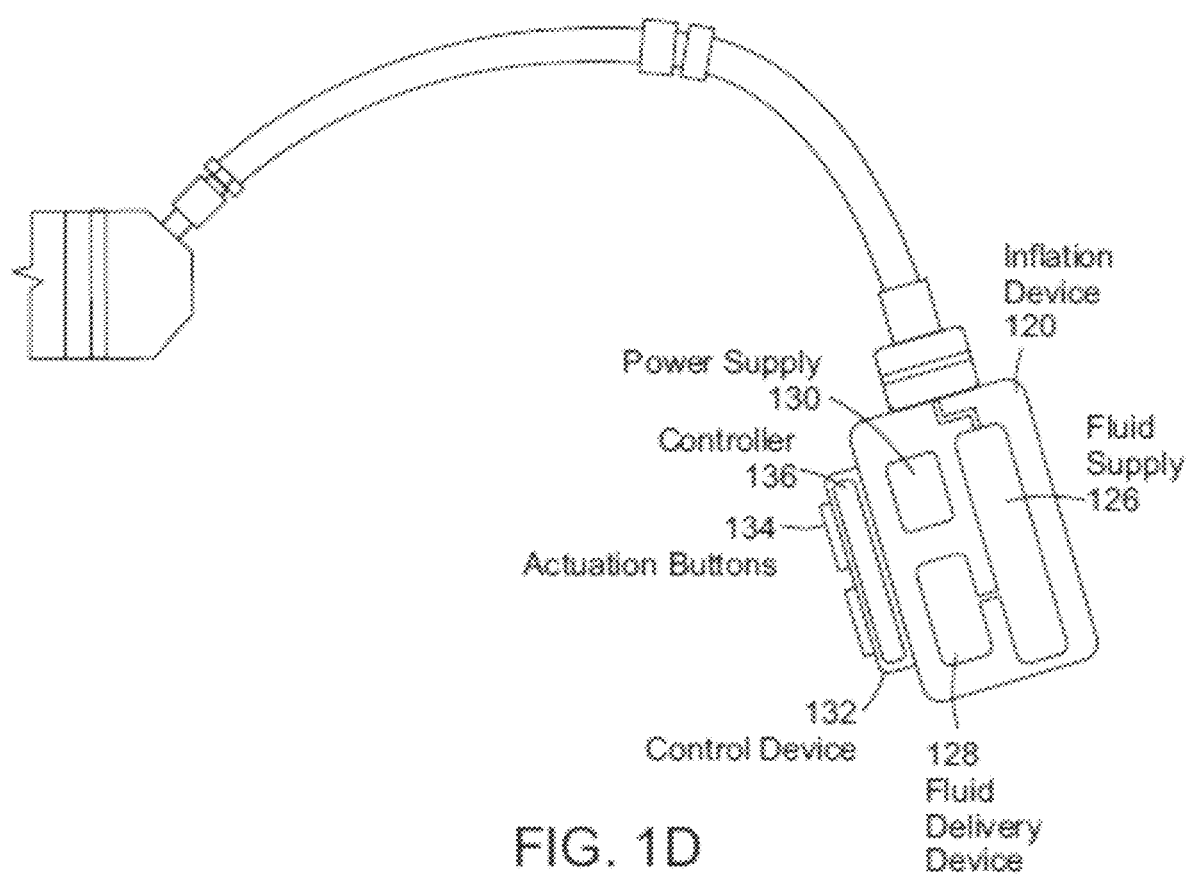

FIGS. 1A-1D depict exemplary soft robotic actuators. More specifically, FIG. 1A depicts a side view of a portion of a soft robotic actuator. FIG. 1B depicts the portion from FIG. 1A from the top. FIG. 1C depicts a side view of a portion of the soft robotic actuator including a pump that may be manipulated by a user. FIG. 1D depicts an alternative embodiment for the portion depicted in FIG. 1C.

An actuator may be a soft robotic actuator 100, as depicted in FIG. 1A, which is inflatable with an inflation fluid such as air, water, saline, or any suitable liquid, gas, gel, foam, etc. The inflation fluid may be provided via an inflation device 120 through a fluidic connection 118.

The actuator 100 may be in an uninflated state in which a limited amount of inflation fluid is present in the actuator 100 at substantially the same pressure as the ambient environment. The actuator 100 may also be in a fully inflated state in which a predetermined amount of inflation fluid is present in the actuator 100 (the predetermined amount corresponding to a predetermined maximum force to be applied by the actuator 100 or a predetermined maximum pressure applied by the inflation fluid on the actuator 100). The actuator 100 may also be in a full vacuum state, in which all fluid is removed from the actuator 100, or a partial vacuum state, in which some fluid is present in the actuator 100 but at a pressure that is less than the ambient pressure. Furthermore, the actuator 100 may be in a partially inflated state in which the actuator 100 contains less than the predetermined amount of inflation fluid that is present in the fully inflated state, but more than no (or very limited) inflation fluid.

In the inflated state, the actuator 100 may exhibit a tendency to curve around a central axis as shown in FIG. 1A. For ease of discussion, several directions are defined herein. An axial direction passes through the central axis around which the actuator 100 curves, as shown in FIG. 1B. A radial direction extends in a direction perpendicular to the axial direction, in the direction of the radius of the partial circle formed by the inflated actuator 100. A circumferential direction extends along a circumference of the inflated actuator 100.

In the inflated state, the actuator 100 may exert a force in the radial direction along the inner circumferential edge of the actuator 100. For example, the inner side of the distal tip of the actuator 100 exerts a force inward, toward the central axis, which may be leveraged to allow the actuator 100 to grasp an object (potentially in conjunction with one or more additional actuators 100). The soft robotic actuator 100 may remain relatively conformal when inflated, due to the materials used and the general construction of the actuator 100.

The actuator 100 may be made of one or more elastomeric materials that allow for a relatively soft or conformal construction. Depending on the application, the elastomeric materials may be selected from a group of food-safe, biocompatible, or medically safe, FDA-approved materials. The actuator 100 may be manufactured in a Good Manufacturing Process ("GMP")-capable facility.

The actuator 100 may include a base 102 that is substantially flat (although various amendments or appendages may be added to the base 102 in order to improve the actuator's gripping and/or bending capabilities). The base 102 may form a gripping surface that grasps a target object.

The actuator 100 may include one or more accordion extensions 104. The accordion extensions 104 allow the actuator 100 to bend or flex when inflated or deflated, and help to define the shape of the actuator 100 when in an inflated or deflated state. The accordion extensions 104 include a series of ridges 106 and troughs 108. The size of the accordion extensions 104 and the placement of the ridges 106 and troughs 108 can be varied to obtain different shapes or extension profiles.

Although the exemplary actuator of FIGS. 1A-1D is depicted in a "C" or oval shape when deployed, one of ordinary skill in the art will recognize that the present invention is not so limited. By changing the shape of the body of the actuator 100, or the size, position, or configuration of the accordion extensions 104, different sizes, shapes, and configurations may be achieved. Moreover, varying the amount of inflation fluid provided to the actuator 100 allows the actuator 100 to take on one or more intermediate sizes or shapes between the un-inflated state and the inflated state. Thus, an individual actuator 100 can be scalable in size and shape by varying inflation amount, and an actuator can be further scalable in size and shape by replacing one actuator 100 with another actuator 100 having a different size, shape, or configuration.

The actuator 100 extends from a proximal end 112 to a distal end 110. The proximal end 112 connects to an interface 114. The interface 114 allows the actuator 100 to be releasably coupled to other parts. The interface 114 may be made of a food- or medically-safe material, such as polyethylene, polypropylene, polycarbonate, polyetheretherketone, acrylonitrile-butadiene-styrene ("ABS"), or acetal homopolymer. The interface 114 may be releasably coupled to one or both of the actuator 100 and the flexible tubing 118. The interface 114 may have a port for connecting to the actuator 100. Different interfaces 114 may have different sizes, numbers, or configurations of actuator ports, in order to accommodate larger or smaller actuators, different numbers of actuators, or actuators in different configurations.

The actuator 100 may be inflated with an inflation fluid supplied from an inflation device 120 through a fluidic connection such as flexible tubing 118. The interface 114 may include or may be attached to a valve 116 for allowing fluid to enter the actuator 100 but preventing the fluid from exiting the actuator (unless the valve is opened). The flexible tubing 118 may also or alternatively attach to an inflator valve 124 at the inflation device 120 for regulating the supply of inflation fluid at the location of the inflation device 120.

The flexible tubing 118 may also include an actuator connection interface 122 for releasably connecting to the interface 114 at one end and the inflation device 120 at the other end. By separating the two parts of the actuator connection interface 122, different inflation devices 120 may be connected to different interfaces 114 and/or actuators 100.

The inflation fluid may be, for example, air or saline. In the case of air, the inflation device 120 may include a hand-operated bulb or bellows for supplying ambient air. In the case of saline, the inflation device 120 may include a syringe or other appropriate fluid delivery system. Alternatively or in addition, the inflation device 120 may include a compressor or pump for supplying the inflation fluid.

The inflation device 120 may include a fluid supply 126 for supplying an inflation fluid. For example, the fluid supply 126 may be a reservoir for storing compressed air, liquefied or compressed carbon dioxide, liquefied or compressed nitrogen or saline, or may be a vent for supplying ambient air to the flexible tubing 118.

The inflation device 120 further includes a fluid delivery device 128, such as a pump or compressor, for supplying inflation fluid from the fluid supply 126 to the actuator 100 through the flexible tubing 118. The fluid delivery device 128 may be capable of supplying fluid to the actuator 100 or withdrawing the fluid from the actuator 100. The fluid delivery device 128 may be powered by electricity. To supply the electricity, the inflation device 120 may include a power supply 130, such as a battery or an interface to an electrical outlet.

The power supply 130 may also supply power to a control device 132. The control device 132 may allow a user to control the inflation or deflation of the actuator, e.g. through one or more actuation buttons 134 (or alternative devices, such as a switch, an interface, a touch display, etc.). The control device 132 may include a controller 136 for sending a control signal to the fluid delivery device 128 to cause the fluid delivery device 128 to supply inflation fluid to, or withdraw inflation fluid from, the actuator 100.

Soft robotic actuators may be useful in many instances where a hard actuator is undesirable. For example, and without limitation, a soft actuator may pick up a packaging blank or preform and provide it to a blow molder, after which the blow molder may reshape the blank into the desired form based on the mold. After being shaped, the molded part will typically be quite hot and deformable. The molded part may be retrieved by the soft actuator without damaging or deforming the molded part. The actuator may then hold the molded part while it is being washed, labeled, filled, and/or capped. Other soft actuators may hold live animals gently, such as for inoculation, analysis or surgery.

One problem in conventional blow molding operations is that the object being grasped has a different shape before and after blow molding (transitioning from the packaging blank to the finally-formed product. Whereas a hard gripper may have difficulty adapting to the changing shape (thus perhaps requiring two different types of grippers for a single blow molding operation, a soft actuator may be sufficiently adaptable to grasp both object shapes using the same gripper.

Soft robotic actuators may be inflated with a predetermined amount of inflation fluid (or to a predetermined pressure), and the inflow/outflow of the actuators and/or the internal pressure of the actuator may be measured. Upon making contact with an object, the actuator may be deflected and, as a result, inflation fluid may flow out of (or into) the actuator. This flow of inflation fluid may serve as a detector that indicates the presence of an object at a position or generally in contact with the actuator. Alternatively, the actuator may include touch sensors, bending sensors, or other types of detection devices for registering contact with an object.

FIGS. 1A-1D depict a particular type of soft robotic actuator, sometimes referred to as an accordion-type soft actuator. However, numerous other types of soft actuators exist, some of which are described in connection with particular embodiments below. Soft actuators include actuators formed partially or entirely from soft or compliant materials, and may incorporate or surround more conventional hard actuator materials.

Soft actuators may move in a variety of ways. For example, soft actuators may bend, as shown above, or may twist, as in the example of the soft tentacle actuator described in U.S. patent application Ser. No. 14/480,106, entitled "Flexible Robotic Actuators" and filed on Sep. 8, 2014. In another example, soft actuators may be linear actuators, as described in U.S. patent application Ser. No. 14/801,961, entitled "Soft Actuators and Soft Actuating Devices" and filed on Jul. 17, 2015. Still further, soft actuators may be formed of sheet materials, as in U.S. patent application Ser. No. 14/329,506, entitled "Flexible Robotic Actuators" and filed on Jul. 11, 2014. In yet another example, soft actuators may be made up of composites with embedded fiber structures to form complex shapes, as in U.S. patent application Ser. No. 14/467,758, entitled "Apparatus, System, and Method for Providing Fabric Elastomer Composites as Pneumatic Actuators" and filed on Aug. 25, 2014.

One of ordinary skill in the art will recognize that other configurations and designs of soft actuators are also possible and may be employed with exemplary embodiments described herein.

End Effectors

An end effector may be the device at the end of a robotic arm, designed to interact with the environment, and/or may be the last link (or endpoint) of the robot. At an endpoint, tools may be attached; or, the end effector may itself act as a tool. An end effector may include one or both of a gripper or a tool. While grippers tend to hold, lift, transport and/or manipulate objects, tool functions often have a contrasting function, and may change a characteristic of the work object rather than gripping or holding it. Tool functions may include welding or fusing, spraying, dispensing, milling, screw or nut driving, flattening, cutting, and combinations of these.

At least four categories of end effector include impactive (e.g., jaws, claws, grasping a work object by direct impact, including holding friction); ingressive (e.g., penetrating the work object with needles, pins, or hackles); astrictive (e.g., essentially non-contact attractive or field forces such as Bernuilli lift, suction, magnetic, electrostatic, van der Waals', ultrasonic standing waves, laser tweezing), and contigutive (e.g., essentially contact adhesive forces via capillary action, glue, surface tension, freezing, chemical reaction).

In hard robotics, gripping may performed by using a form-following static shape in the gripping surface (e.g., a concave cup to lift a round object), or by friction force increased by closing hard fingers, jaws or claws. A soft robotic end effector may include gripper functionality, and may also or alternatively include some tool functionality.

Soft robotic grippers may be impactive, and may additionally be made ingressive, astrictive, and/or contigutive via a particular gripper/actuation morphology or configuration, or by adding an accessory tool within or along or opposite the soft robotic gripper.

A soft robotic gripper may include one or more soft robotic members, which may take organic prehensile roles of finger, arm, tail, or trunk, depending on the length and actuation approach. In the case of inflating and/or deflating soft robotic members, two or more members may extend from a hub, and the hub may include a manifold for distributing fluid (gas or liquid) to the gripper members and/or a plenum for stabilizing fluid pressure to the manifold and/or gripper members. The members may be arranged like a hand, such that the soft robotic members act, when curled, as digits facing, a "palm" against which objects are held by the digits; and/or the members may also be arranged like an cephalopod, such that the soft robotic members act as arms surrounding an additional central hub actuator (suction, gripping, or the like). Generally, although not exclusively, as used herein, the terms "base plate", "palm plate", "bumper plate", or "hub plate" may refer to a reference surface adjacent two or more soft robotic members against which the soft robotic member may hold a work object, e.g., when curled in a "closing" direction, and from which the grip of the soft robotic members on the work object may be released, e.g., when the soft robotic members are curled or recurled in an "opening" direction. The use of "plate" does not suggest that the member is fully planar—"plates", unless otherwise described, may have surface relief, contour, curves, peaks and valleys, texture, or the like—a "plate", unless otherwise described, describes a member fitting within a plate-like envelope or aspect ratio.

Soft robotic gripper members may be formed of elastomeric materials, such as rubber, and/or thin walls of plastic arranged in an accordion structure that is configured to unfold, stretch, and/or bend under pressure, or other suitable relatively soft materials. Soft robotic gripper members may include a channel and/or hollow interior that can be filled with a fluid, such as air, water, or saline to pressurize, inflate, and/or actuate the gripper member. Upon actuation, the shape or profile of the gripper member changes by, e.g., variably curving, curling, including in opposing directions, or straightening. Alternatively or in addition, the gripper member may be actuated using a vacuum to remove inflation fluid from the gripper member and thereby change the degree to which the gripper member bends, twists, and/or extends.

Actuation may also allow the gripper member(s) to exert a force on a workpiece, such as a workpiece being grasped or pushed, as well as partially or fully conforming to the shape of the workpiece being grasped. Soft robotic gripper members can also harmlessly deflect upon collision with workpieces or the work environment.

Exemplary Bone-In Meat Handling Grippers

Exemplary embodiments described herein relate meat handling robotic grippers employing soft actuators, as described above.

As previously noted, previous robotic meat handling grippers suffered from several problems when used to grip a meat product. Because the meat (particularly when defrosted or cooked) is relatively malleable, it can be difficult for a robotic gripper to secure a firm grasp on the meat without damaging it. This problem is further complicated if the meat product includes a bone. A bone presents different characteristics, such as being harder or less malleable, than the surrounding meat, which increases the complexity of attempting to grasp a bone-in meat product with a robotic gripper.

For instance, and end effector may include several robotic actuators mounted on a plate. When grasping a target, the fingers may push the target into the plate to secure a grip on the target. However, with a bone-in meat product, the bone may be pushed into the plate first. Because the bone is harder than the surrounding meat (and therefore resists the pushing action of the actuators to a greater degree), the bone stops the actuators from pushing the meat securely into the plate. Accordingly, the actuators may not hold the meat product securely, and it may be dropped before being delivered to its destination.

Figures 2A, 2B:
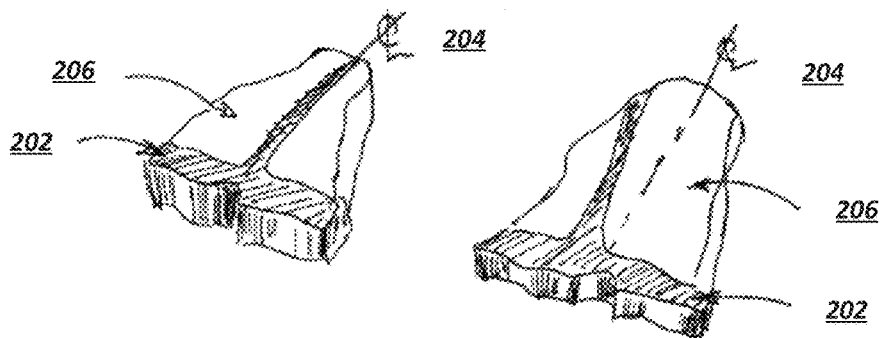
FIGS. 2A-2B depict exemplary bone-in meat products suitable for use with exemplary embodiments described herein.

Moreover, different cuts of meat may have different sizes, shapes, or orientations of bones. For example, FIG. 2A depicts an exemplary T-Bone steak, in which the bone 202 is relatively centered along a central axis 204 extending along the length of the cut, with respect to the meat 206. This can be compared to the Porterhouse steak depicted in FIG. 2B, in which the bone 202 is off-center as compared to the central axis 204.

Thus, a solution that works for one type of bone-in meat product may not be applicable to another type of bone-in meat product in which the bone is a different size, shape, or orientation. Therefore, in order to handle multiple different types of bone-in meat products, it may be necessary to switch out the robotic end effector used to grasp the meat for each different product to be grasped. This adds time and complexity to any process involving the handling of meat.

Figure 3:
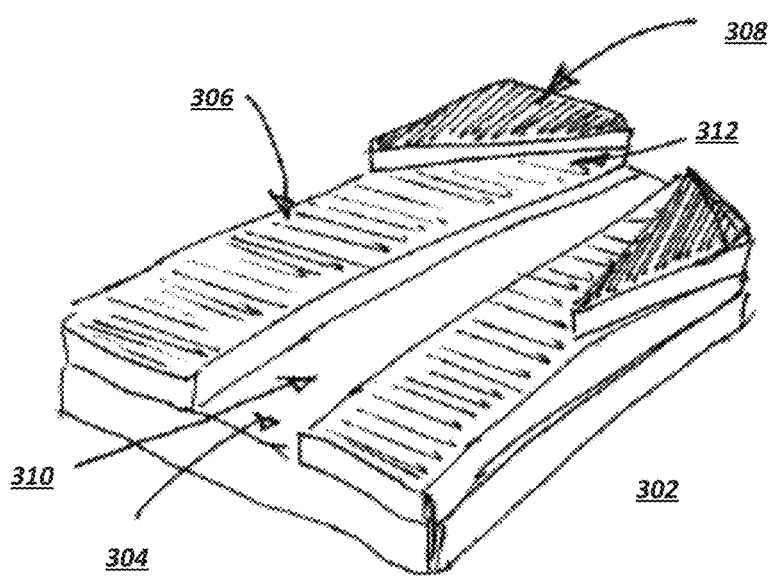
FIG. 3 depicts an exemplary bumper plate for grasping bone-in meat products.

The present application provides examples of meat grippers that use specially-configured bumper plates to address these and other problems. For example, FIG. 3 depicts an exemplary bumper plate in 302 accordance with the present disclosure. The bumper plate is configured to provide two different grooved areas to lead-in and capture the bone structure of different types of bone-in meat products.

More specifically, the bumper 302 includes a first (bottom) layer 304, a second (intermediate) layer 306, and a third (top) layer 308. The shape and structure of the second layer 306 is such that a groove 310 is defined between the first layer 304 and the second layer 306. In this example, the groove 310 is a central groove that is useful for capturing a central bone, such as in the T-Bone steak example of FIG. 2A.

Figure 4:
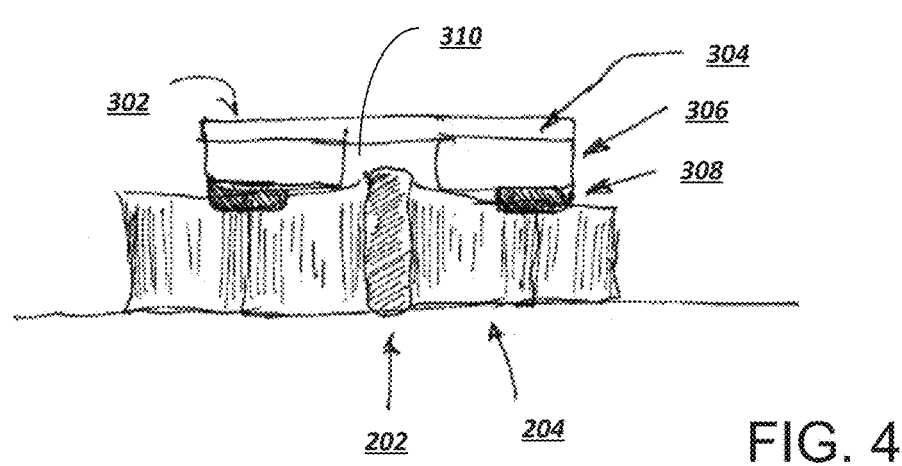
FIG. 4 depicts a side-view of the exemplary bumper plate in use.

More specifically, in operation the bumper plate 302 may be pressed into the meat product, as shown in FIG. 4. The bumper plate 302 serves as a backstop for the meat product. The central bone 202 can extend into the central groove 310, allowing a set of actuators to push the meat 204 into the second layer 306 and the third layer 308. This allows the actuators to secure a better grip on the meat 204.

Moreover, the central groove 310 can serve as an antirotate feature for the bone 202. As the meat product is being grasped by a set of actuators, the meat product may shift (either in the grasping process, or in transit). This may weaken the grip of the actuators on the meat product. However, if the meat product rotates or shifts until the bone 202 is in contact with the side walls of the central groove 310, the meat product will be restrained from further moving; thus, the width of the groove 310 can be defined based on the expected or average size of the bone 202 as well as the amount of translation or rotation of the meat product that is to be permitted in the grasping process.

Returning to FIG. 3, the shape and structure of the third layer 308 is such that a groove 312 is defined between the second layer 306 and the third layer 308. In this example, the groove 312 is angled so as to better capture a bone extending at an angle, such as in the Porterhouse steak example of FIG. 2B. Similar to the above example with the T-Bone steak, the bone 202 of the Porterhouse may be pushed against the side walls of the groove 312 to prevent translation or rotation. Moreover, actuators may push the meat portion 204 of the Porterhouse into the structure of the second layer 306 and/or the third layer 308 in a similar manner to the one shown in FIG. 4.

By providing a symmetrically-shaped groove, an offangle bone can be accommodated regardless of whether the bone extends to the left or to the right. This obviates the need to flip the meat product before grasping it (which would otherwise be needed in order to ensure that all products are presented to the gripper in the same orientation).

The various layers 304, 306, 308 of the bumper plate 302 may be made from different pieces that are secured together, or may be machined from a single block of material. Preferably, the edges and corners of the bumper plate 302 may be rounded or smooth, with transition areas between layers so as to reduce harborage points for bacteria.

Various materials for the bumper plate 302 can be selected to suit the application or grasp target, including compliant materials and sanitary materials. The preferred materials for making the bumper plate 302 are 303, 304, 316, & 316L stainless steel for metal parts and the plastic should be low porosity and does not swell more than 2% in moist environments. The preferred materials should be resistant to strong acids and strong bases as well as a high concentration of chloride ions. These chemical properties will allow the gripper hub to not be damaged by standard cleaning chemicals used in food production facilities. In some embodiments, the bumper plate 302 may be an electro-adhesive pad.

Figure 5:
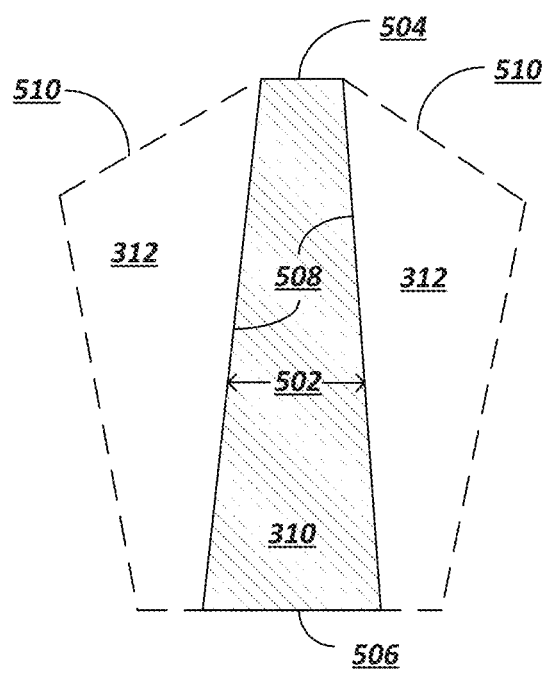
FIG. 5 depicts the shapes of the central and angled grooves defined by the exemplary bumper plate.

FIG. 5 depicts an exemplary structure for the central groove 310 (shaded) and an exemplary structure for the angled groove 312 (unshaded). The central groove 310 in this example includes a width 502 representing a distance between side walls 508 defining the shape of the groove. The side walls 508 may be part of the second layer of the bumper plate. In some embodiments, the side walls 508 may be substantially parallel to each other. Alternatively, the side walls 508 may be offset at an angle, as in the example shown in FIG. 5. In this example, the side walls 508 taper so that the width 502 of the central groove 310 is reduced at a top end 504 of the bumper plate (in the vicinity of the protrusions defining the third layer in the preceding example), and increased at a bottom end 506 of the bumper plate. The tapered width may be useful to guide the bone into a particular configuration, or may be used to accommodate a bone that decreases in width as it extends from a T-intersection (as many t-bone steaks do).

The angled grove 312 may be defined by one or more angled walls 510 at the top end 504 of the bumper plate. The angles of these walls 510 with respect to the top end 504 and/or the sides of the bumper plate may be selected based on an expected or average angle of an angled bone (i.e., one that does not extend substantially straight and longitudinally through the length of the meat product) in a type of meat products to be grasped The central groove 310 and the angled groove 312 each also include a depth (extending into and out of the page, in this example). The depth of each groove may be selected based on one or more of an expected or average depth of the bone for various types of meat products and/or properties of meat attached to the bone (a degree of malleability or compressibility, an amount of meat available, etc.).

Figure 6:
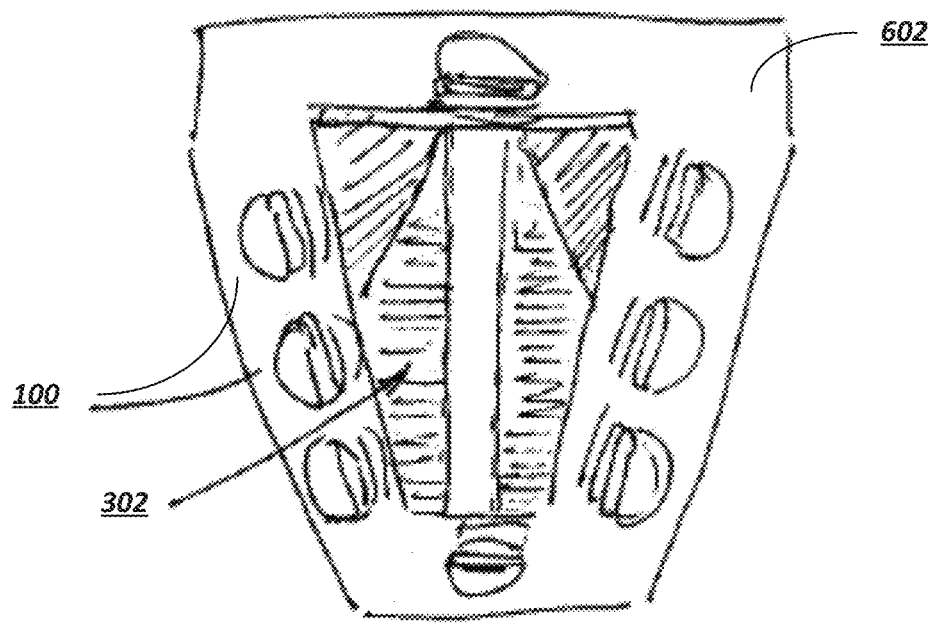
FIG. 6 depicts an exemplary end-of-arm tool for a robot employing the exemplary bumper plate.

FIG. 6 depicts an example of an end effector 602 including a bumper plate 302 and a plurality of actuators 100 (eight, in this example). In use, the bumper plate 302 may be pressed into the meat product, and the actuators may be actuated to begin to curl around the meat product. Initially, the actuators 100 may curl around the side of the meat product, and as the meat product is initially secured and lifted, the actuators 100 may continue to curl to push against a side of the meat product opposite the bumper plate 302. In this way, the actuators 100 may push the meat product into the bumper plate. In some embodiments, suction or adhesion may be applied to better initially secure the meat product to the bumper plate 302. In some embodiments, the actuators 100 may be provided with a hooked tip or other protrusion that allows the actuators 100 to insert their distal ends under the meat product (e.g., between the meat product and a surface that the meat product is resting upon) in order to push the meat product into the bumper plate 302.

The actuators 100 squeeze and press the meat 204 portion of the meat product into the bumper plate 302 to lock it into position. Because the actuators 100 do not engage with the bone 202 of the meat product, a better grip may be secured (although, in some embodiments, the actuators 100 may be specifically sized and positioned to engage with the bone portion 202, exclusively or in conjunction with engaging with the meat portion 204).

Figure 7:
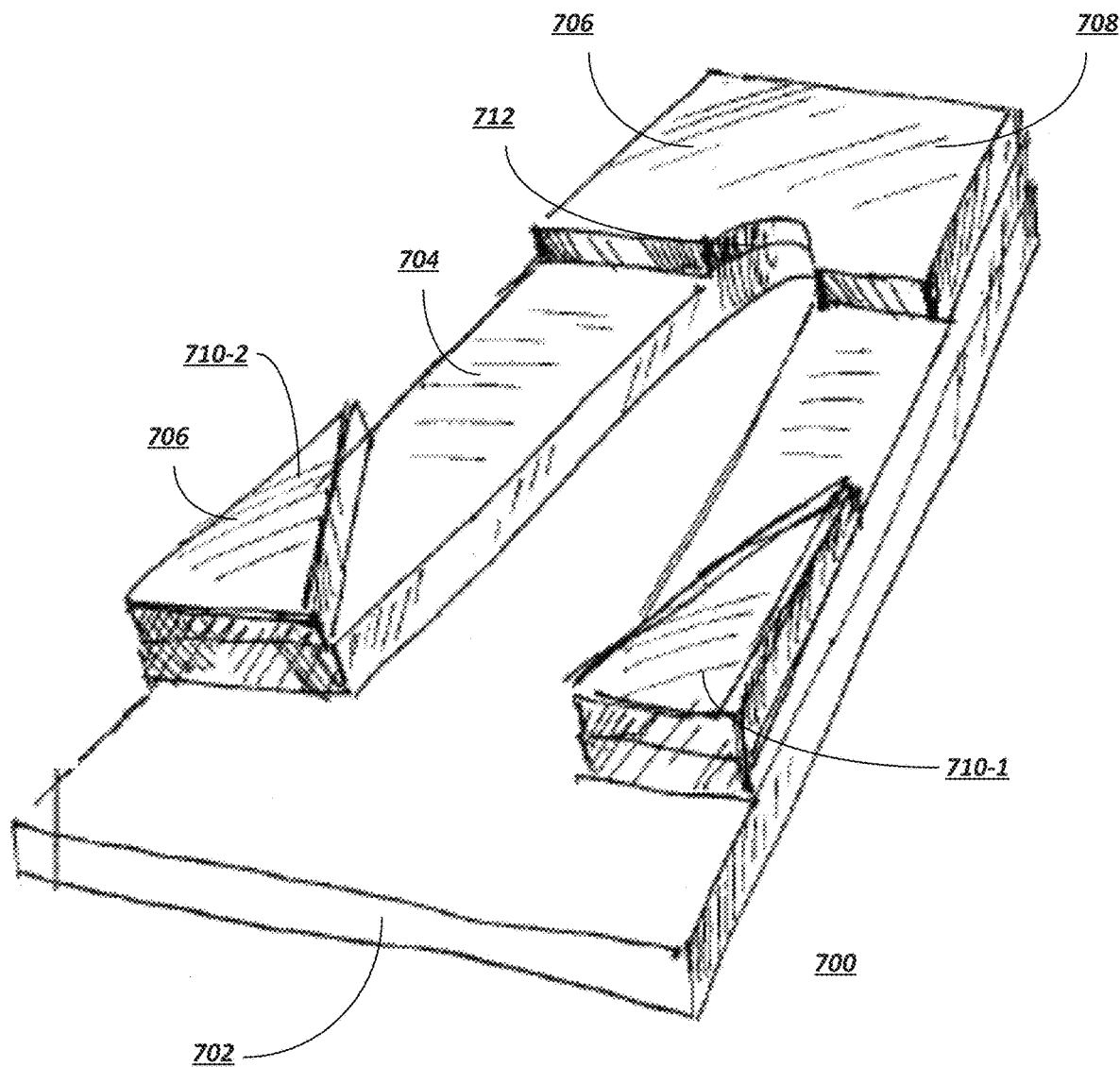
FIG. 7 depicts an alternative configuration for the bumper plate.
Figure 8:
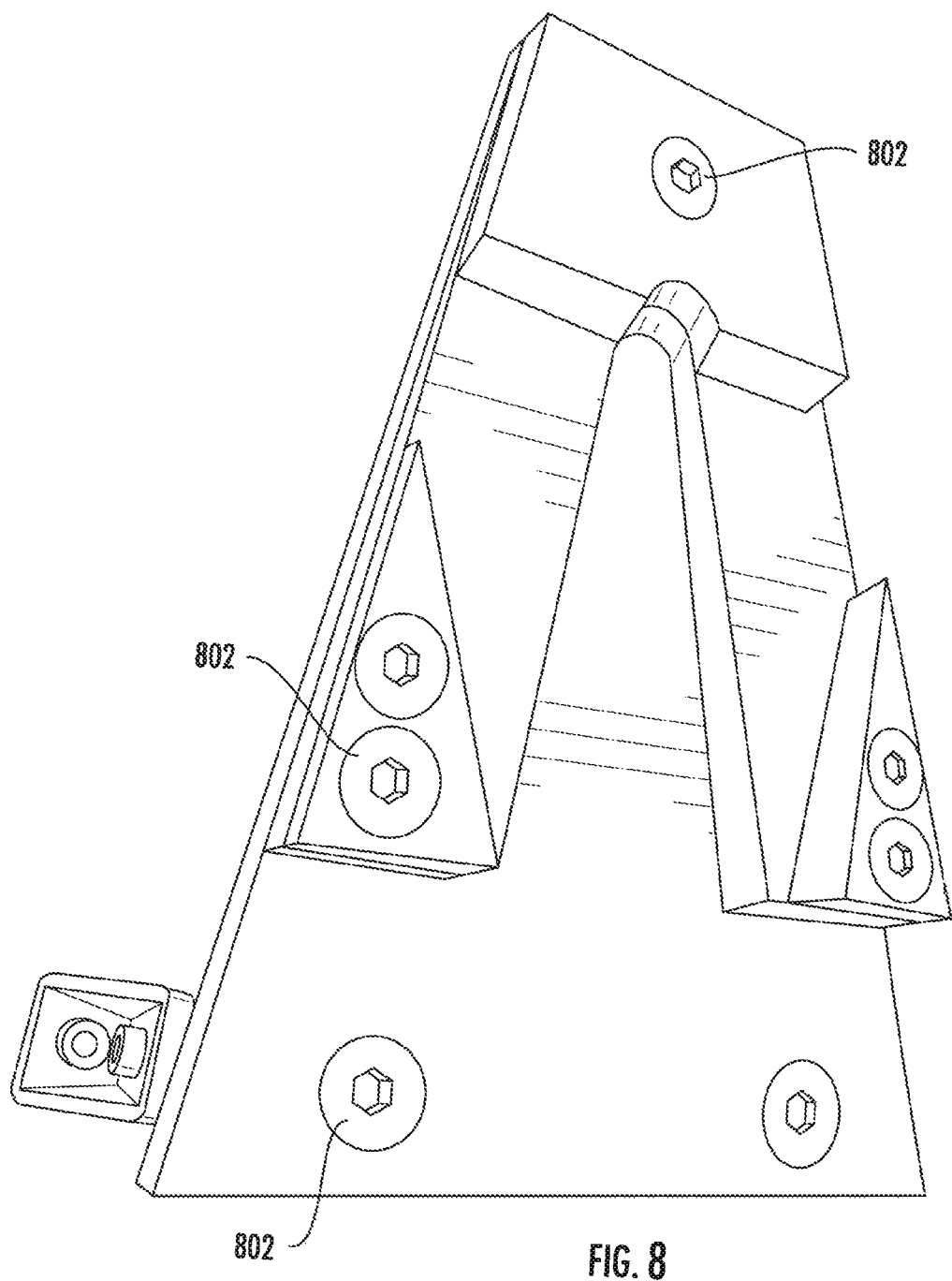
FIG. 8 depicts an example of a bumper plate having screws passed through through-holes to secure the layers together and to secure the bumper plate to an end-of-arm tool.

FIG. 7 and FIG. 8 depict an alternate configuration for a bumper plate 700. In this alternate configuration, the bumper plate includes a first layer 702, a second layer 704, and a third layer 706. The second layer 702 defines a central groove (tapered, in this case), whereas the third layer defines an angled groove. However, the third layer includes triangular protrusions 710-1, 710-2 provided on one side (towards the bottom of the page, in this case) of the bumper plate 700, and a third protrusion 708 which is a substantially rectangular block. Meat products such as T-bone steaks can continue to be secured in the central groove, whereas meat products with angled bones can have those bones pressed against the triangular protrusions 706 at one end, and can have their bottom surfaces secured against the third protrusion 708. In this case, the third protrusion includes a divot 712 that facilitates capture of a straight central bone, while still presenting a mostly flat edge to allow the bottom portion of the meat product to be secured.

FIG. 8 depicts a number of screws 802 that are passed through through-holes in the various layers of the bumper plate. These screws 802 may be used to secure the bumper plate to a robotic end-of-arm-tool. In embodiments in which the bumper plate is provided as a distinct series of layers, the screws 802 may secure the layers together. The use of such screws has the additional advantage that different layers of different shapes or configurations (e.g., different third layers defining different angles for the angled groove, different second layers defining different depths or widths for the central groove, layers made up of different materials having different properties, etc.) can be easily swapped in, depending on the type of meat product to be grasped.

Figure 9:
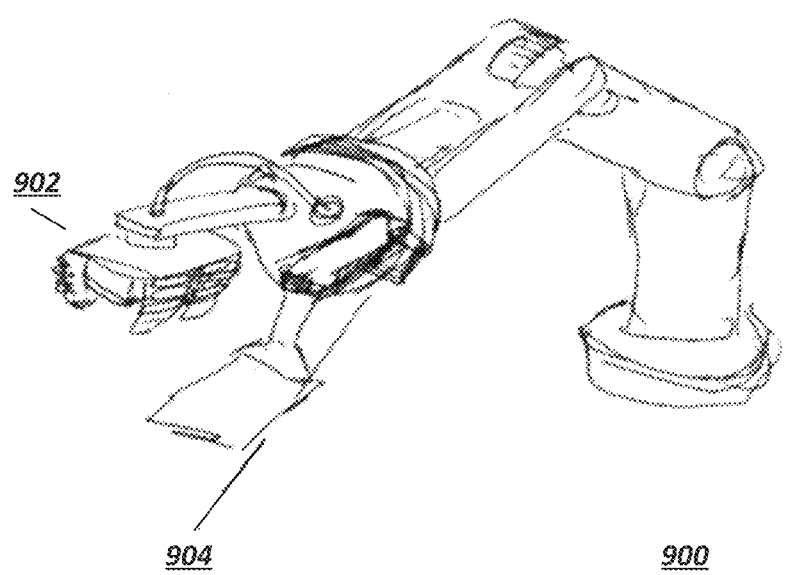
FIG. 9 depicts an exemplary robotic system employing an end-of-arm tool including a bumper plate and a second end-of-arm tool including a spatula.

The exemplary gripper described above may be employed as a robotic end-of-arm tool (EOAT). An example of such a robotic arm 900 is depicted in FIG. 9. In this example, an exemplary gripper 902 may be provided at the end of the robotic arm 900 in conjunction with a robotic spatula 904, thereby allowing the robotic arm 900 to grasp meat from a stack, deliver the meat to a grill or oven, or a conveyor belt leading onto a grill or into an oven (potentially after the same or another robotic station removes paper from the meat), optionally flip the meat on the grill with the spatula 904, and deliver the cooked meat to a delivery location with the spatula 904.

In some embodiments, the robotic arm 900 may further include a temperature sensor, such as a meat thermometer or infrared sensor, to monitor the cooking of the meat and determine when it should be flipped.

In some embodiments, the EOAT may include an actuated pincer that can remove the paper from each patty. In other embodiments, the pincer is part of a nearby station where the robot presents the meat patty with paper to the machine to have the paper removed.

Grasping Method

Figure 10:
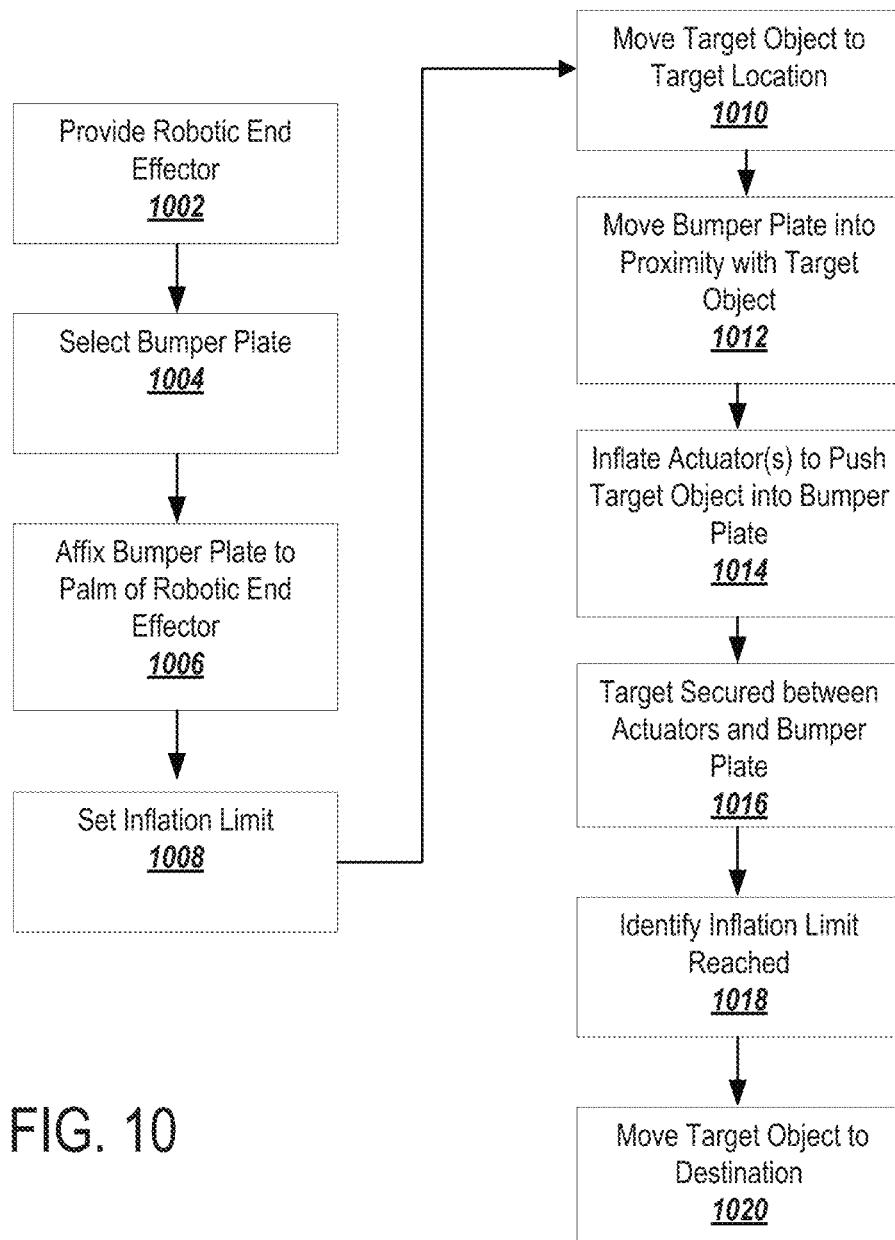
FIG. 10 is a flowchart describing an exemplary grasping technique in accordance with exemplary embodiments.

FIG. 10 describes a procedure for deploying and using an end effector with a bumper plate as described above.

At block 1002, a robotic end effector may be provided. The robotic end effector may be any device suitable for grasping or otherwise manipulating a target object. The robotic end effector may include a robotic arm, a robotic grasper or hand, a robotic tentacle, an end-of-arm tool (EOAT), etc. The robotic end effector may be separate from the stabilization device, or may be integral with the stabilization device. The robotic end effector may be at a fixed location, or may be mobile.

At block 1004, a bumper plate may be selected for deployment on the robotic end effector. The bumper plate may have a size, shape, texture, configuration, etc. specific to the bumper plate, and a particular bumper plate may be selected based on the context in which it is employed. Among other features, the stabilization device may be selected based on: a number, size, or configuration of actuators on the end effector; a size, shape, texture, etc. of an exterior surface of the target object; a size, shape, weight, etc. of a bone present in the target object (or of any area having different characteristics or properties as compared to the remainder of the target object, which the bumper plate can accommodate) a compressibility and/or degree of movement or shifting expected based on material on an interior of the target object; a direction of movement of the target object once grasped, a weight of the target object; etc.

At block 1006, the bumper plate may optionally be affixed to a palm area of the robotic end effector, if the bumper plate and end effector are not integral. The bumper plate may be affixed using fasteners, such as bolts or screws that pass through a base of the robotic end effector and a base of the bumper plate (see FIG. 8), and may be secured using nuts. Alternatively or in addition, the bumper plate may be affixed using clamps, screws, pins, a magnetic attachment, suction, ties, mating grooves, tabs, or slots, or any other suitable fasteners.

At block 1008, an inflation limit may be selected for soft actuators of the robotic end effector (alternatively, if hard actuators are used, a maximum extension limit may be defined). The limit may be defined based on a target pressure to which the actuators should be inflated, a target amount of force to be applied to the target object, a distance of extension or degree of flexion desired of the actuator, etc.

Instead of a particular value, an acceptable inflation range may be provided. According to some embodiments, the inflation limit may preferably be in the range of 9-13 pounds per square inch (PSI). In another embodiment, the limit may be a range of values such that the lower end of the range corresponds to an amount of inflation/extension that would be barely sufficient to hold the target object through a desired movement sequence (e.g., a value determined empirically or by simulation that maintains a grasp on the target object more than a predetermined percentage of times); the upper end may correspond to a maximum amount of inflation/extension such that further inflation/extension would cause damage to the product. In some embodiments, the inflation limit may be selected to correspond to a degree of deployment of the actuators such that, when the actuators are deployed to the identified degree, the target object is secured to the stabilization device in a desired configuration (e.g., bent around the stabilization device by a desired amount, deformed or manipulated to a certain degree, etc.).

At block 1010, the target object may be moved to a target location. The target object may be moved, for example, into a position under the robotic end effector. In some embodiments, the target object may be moved into position along a conveyor belt. In some embodiments, the target object may be provided to the target location in a predetermined position (e.g., so that the long axis of the target object is oriented in a predetermined direction), or may be manipulated by the end effector or another device so as to be moved into the predetermined position once the target object is moved into the target location.

At block 1012, the bumper plate may be moved into proximity with the target object. In some embodiments, this may involve making contact with the target object, while in others the bumper plate may be moved to within a predetermined distance of the target object. The movement of the bumper plate (and the end effector to which it is attached) may be guided by various sensors, such as proximity sensors, cameras, touch sensors, etc. In some embodiments, the end effector may be positioned in this block so as to be relatively centered over an axis of the target object 302. The axis of the target object may represent a grasping axis along which the actuators may be arrayed (e.g., along a long axis of the bumper plate when the object is grasped).

At block 1014, the actuators may be inflated to push the target object into the bumper plate. The actuators may be inflated by supplying an inflation fluid to the actuators (e.g., through tubing or another delivery mechanism that supplies the inflation fluid into the inner void of the actuator). As the actuators are inflated, they may make contact with (e.g.) the ends of the target object, and may proceed to curling around the target object to secure a grasp on a bottom surface of the target object. The target object may be slightly deformed or pressed between the actuators and the bumper plate. Portions of the target object, such as the bone in a bone-in meat product, may be pushed into grooves in the bumper plate and/or pressed against a side wall of a groove.

At block 1016, the target object may continue to be pressed into the groove(s) of the bumper plate until, at block 1018, the system identifies that the inflation limit has been reached (or that the inflation amount, or degree of extension for a hard actuator, is within the range identified in block 1008).

Having thus secured the target object in the grip of the end effector, at block 1020 the end effector may be translated and/or rotated to move the target object to a desired destination or configuration.

The above-described method may be embodied as instructions or logic stored on a non-transitory computer-readable medium. When executed, the instructions or logic may cause a processor circuit to perform the above-described method using a robotic system.

General Notes on Terminology

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

In the foregoing description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

Any or all of the above-described techniques may be implemented by suitable hardware, including pneumatic, hydraulic, mechanical, electrical, magnetic, etc. hardware. Some embodiments may utilize logic stored on a non-transitory computer-readable medium. When executed by one or more processors, the logic may cause the processors to perform the techniques identified above. The logic may be implemented fully or partially in hardware. The logic may be included as part of a controller for controlling the actuation, de-actuation, movement, position, etc. of a soft robotic actuator and/or a soft robotic system employing one or more actuators in a gripper arrangement.

As used herein, structures, acts, steps, and functions are given various names or labels. This paragraph describes terminology that is used alternatively, in some cases interchangeably, and in some cases equivalently. Generally, one of skill in the art will recognize and understand identity, equivalency, and the similarities and differences among alternative terms of art and/or words having a plain technical meaning. As used herein, an end effector may include an effector including a tool or one to which a tool may be mounted, including the gripper 902 and the like. An organic article may be a meat article or meat product, such as (non-exhaustively) meat patty 314 or an organic article having similar properties (e.g., soy-based equivalent). Bendable members may include soft robotic members such as soft robotic actuators 100. An ejection mechanism or ejection force may forcibly eject an article, but need not forcibly eject an article, but may release it to fall under the effect of gravity—e.g., an ejection force may be largely gravity, applied by releasing the article. A palm plate may include a portion of a gripper assembly including a surface against which articles may be pressed, such as a planar or vaccum pad or bumper plate 302. A perforated air table may include a surface with a plurality of holes for permitting fluid flow through the holes, often air flow, such as a suction pad. A spatula member may be stationary with respect to a supporting drive system or articulated, such as robotic spatula 904.

We claim:

1. A bumper plate for a robotic end effector comprising one or more robotic actuators capable of moving between an undeployed state and a deployed state by curving along a central axis of rotation, a distal end of the one or more robotic actuators being brought into proximity with a palm region of an end effector base when the one or more actuators is in the deployed state, the bumper plate comprising:

a first layer configured to be affixed to the robotic end effector;
   a second layer provided on a top surface of the first layer, the second layer sized and shaped so as to create a lengthwise-extending central groove with respect to the first layer, wherein the central groove is sized and shaped to accept a bone of a second type of meat product that extends through the meat product in substantially a straight line in a longitudinal direction; and
   a third layer provided on a top surface of the second layer, the third layer sized and shaped so as to create an angled groove with respect to the second layer, an angle of the angled groove selected so as to accommodate a bone of a first type of meat product that extends through the meat product at an angle.

2. The bumper plate of claim 1, wherein the angled groove includes two angled edges that are symmetrical with respect to a central length-wise extending axis of the lengthwise-extending central groove.

3. The bumper plate of claim 1, wherein distal tips of the actuators are configured to push a meat portion of the meat product into at least one of the second layer or the third layer.

4. The bumper plate of claim 1, wherein edges of the central groove are parallel to each other.

5. The bumper plate of claim 1, wherein edges of the central groove are tapered from a relatively narrow width at a first end of the bumper plate to a relatively wider width at second end of the bumper plate.

6. The bumper plate of claim 1, wherein the third layer comprises two angled protrusions on a first side of the bumper plate.

7. The bumper plate of claim 6, wherein the third layer further comprises a third protrusion on a second side of the bumper plate opposite the first side, the third protrusion having an edge facing the two angled protrusions that is substantially flat or indented.

8. The bumper plate of claim 1, wherein the first, second, and third layers comprise through-holes to secure the bumper plate to the robotic end effector.

9. The bumper plate of claim 1, wherein a depth of at least one of the central groove or the angled groove is selected based on an average depth of a bone for meat products of the type to be held in the respective central groove or angled groove.

10. A method comprising:
    affixing the bumper plate of claim 1 to the robotic end effector; and
    actuating the one or more robotic actuators to grasp the meat product between the robotic actuators and one or more of the first layer, the second layer, or the third layer.

11. The method of claim 10, further comprising providing soft robotic actuators as the one or more robotic actuators.

12. The method of claim 10, further comprising inflating the one or more robotic actuators to a pressure of 9-13 pounds per square inch (PSI).

13. The method of claim 10, further comprising positioning the robotic end effector so that a long axis of the central groove of the bumper plate aligns with a long axis of the bone of the meat product.

14. The method of claim 10, further comprising positioning the robotic end effector so that an angled bone of the meat product aligns with the angled groove of the bumper plate.

15. The method of claim 10, wherein the third layer comprises two angled protrusions on a first side of the bumper plate and a third protrusion on a second side of the bumper plate opposite the first side, the third protrusion having an edge facing the two angled protrusions that is substantially flat or indented, and further comprising positioning the robotic end effector so that the meat product is between the two angled protrusions and the edge of the third protrusion.

16. The method of claim 10, further comprising reverse-actuating the one or more robotic actuators prior to moving the bumper plate into position.

17. The method of claim 10, further comprising moving the bumper plate into contact with a target object before actuating the actuators.

18. The method of claim 10, further comprising moving the bumper plate so that the bumper plate is spaced away from a target object but within a predetermined distance range prior to actuating the actuators.

19. The method of claim 10, further comprising translating or rotating the robotic end effector while grasping the meat product, the translating or rotating pushing the bone into an edge of the central groove or the angled groove of the bumper plate.

* * * * *